(12) United States Patent
Fossati et al.

(10) Patent No.: US 6,485,860 B2
(45) Date of Patent: Nov. 26, 2002

(54) PLUG-HOLDER STRIP FOR BATTERIES AND A BATTERY INCLUDING THE STRIP

(75) Inventors: Giuseppe Fossati, Mozzanica (IT); Giordano Ferla, Capralba (IT)

(73) Assignee: Societa' Industriale Accumulatori S.p.A., Turin (IT)

( * ) Notice: Subject to any disclaimer, the term of this patent is extended or adjusted under 35 U.S.C. 154(b) by 0 days.

(21) Appl. No.: 09/930,449

(22) Filed: Aug. 16, 2001

(65) Prior Publication Data

US 2002/0028606 A1 Mar. 7, 2002

(30) Foreign Application Priority Data

Aug. 17, 2000 (IT) .......................... TO00A0806

(51) Int. Cl.⁷ .............................................. H01M 2/12
(52) U.S. Cl. .......................................... 429/87; 427/89
(58) Field of Search ................................. 439/627, 138, 439/310, 34, 35, 474, 259; 429/72, 82, 84, 53, 56, 86, 54, 178, 180, 87, 88, 89, 185

(56) References Cited

U.S. PATENT DOCUMENTS 5,981,099 A * 11/1999 Bourbeau .................... 429/53

FOREIGN PATENT DOCUMENTS

| EP | 1 017 119 A1 | 7/2000 |
|----|----|----|
| GB | 2 327 141 A | 1/1999 |

* cited by examiner

*Primary Examiner*—Renee Luebke
*Assistant Examiner*—Phuongchi Nguyen
(74) *Attorney, Agent, or Firm*—Sughrue Mion, PLLC

(57) ABSTRACT

A plug-holder strip for an accumulator battery includes a plurality of plugs to be fitted in complementary holes in a cover of a battery, and a support structure which interconnects the plugs, the plugs being connected to the support structure by a yielding connection which allow the plugs to move relative to the support structure to enable the plugs to be aligned with the holes in the cover, and wherein each plug is fitted in a through-hole in the support structure, and the connection includes an annular sealing member which surrounds the hole and forms a seal between the plug and the support, and a retainer which are associated with the support structure and compress the plug onto the sealing member to ensure leaktightness while maintaining the ability of the plug to move relative to the support.

6 Claims, 3 Drawing Sheets

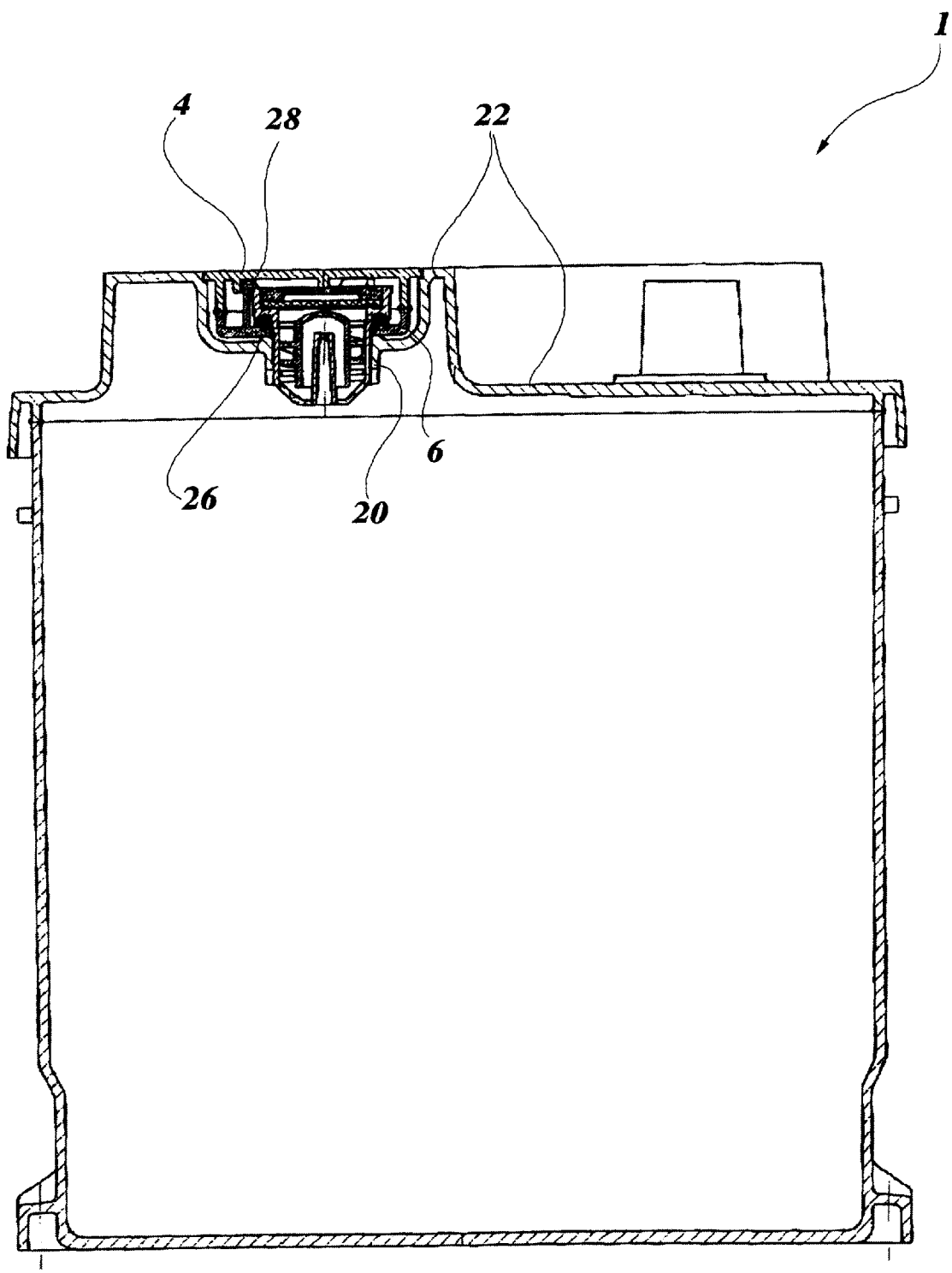

PLUG-HOLDER STRIP FOR BATTERIES AND A BATTERY INCLUDING THE STRIP

BACKGROUND OF THE INVENTION

The present invention relates to a plug-holder strip for an accumulator battery and to a battery including the strip.

In particular, the invention relates to a plug-holder strip of the type comprising:

a plurality of plugs to be fitted in complementary holes in the cover of the battery, and a support structure which interconnects the plugs, the plugs being connected to the support structure by yielding connection means which allow the plugs to move relative to the support structure to enable the plugs to be aligned with the holes in the cover.

A strip structure having the above-mentioned characteristics is described in EP-A-1 017 119 in the name of the Applicant. In this structure, the plugs are connected to a support plate by regions with corrugated or grooved profiles, which have an annular shape in plan and surround each plug, and which constitute integral parts of the plate-like interconnection and support element. These annular regions, which can undergo resilient or plastic deformation, afford the plugs the mobility necessary for the axis of each plug perpendicular to the plane of the plate to be aligned or made to coincide with the axis of the complementary hole in the cover so as to achieve a good seal between the plugs and the cover.

Although the structure described therein can effectively solve the problems relating to the sealing and the alignment of the plugs with the battery cover, its production involves difficulties relating particularly to the moulding of the plug-holder strip in a single piece.

SUMMARY OF THE INVENTION

The aim of the present invention is to provide an improved solution which solves the problems mentioned above with regard to alignment and sealing, and which is easy to manufacture from the production and technological points of view.

In view of this aim, a subject of the invention is a plug-holder strip for an accumulator battery of the above-mentioned type, characterized in that each plug is fitted in a through-hole in the support structure, and in which the means for connecting each plug to the support structure comprise an annular sealing member which surrounds the hole and forms a seal between the plug and the support, and retaining means which are associated with the support structure and press the plug onto the sealing member to ensure leaktightness whilst maintaining the ability of the plug to move relative to the support structure.

A further subject of the invention is an accumulator battery, particularly a starter battery, comprising a plurality of cells in series and comprising the above-mentioned plug-holder strip.

BRIEF DESCRIPTION OF THE DRAWINGS

Further characteristics and advantages of the invention will become clear from the following detailed description, given with reference to the appended drawings provided purely by way of non-limiting example, in which:

FIG. 3 is a partially-sectioned side view of an accumulator battery comprising the plug-holder strip of FIG. 1.

DETAILED DESCRIPTION OF THE INVENTION

Figure 1:
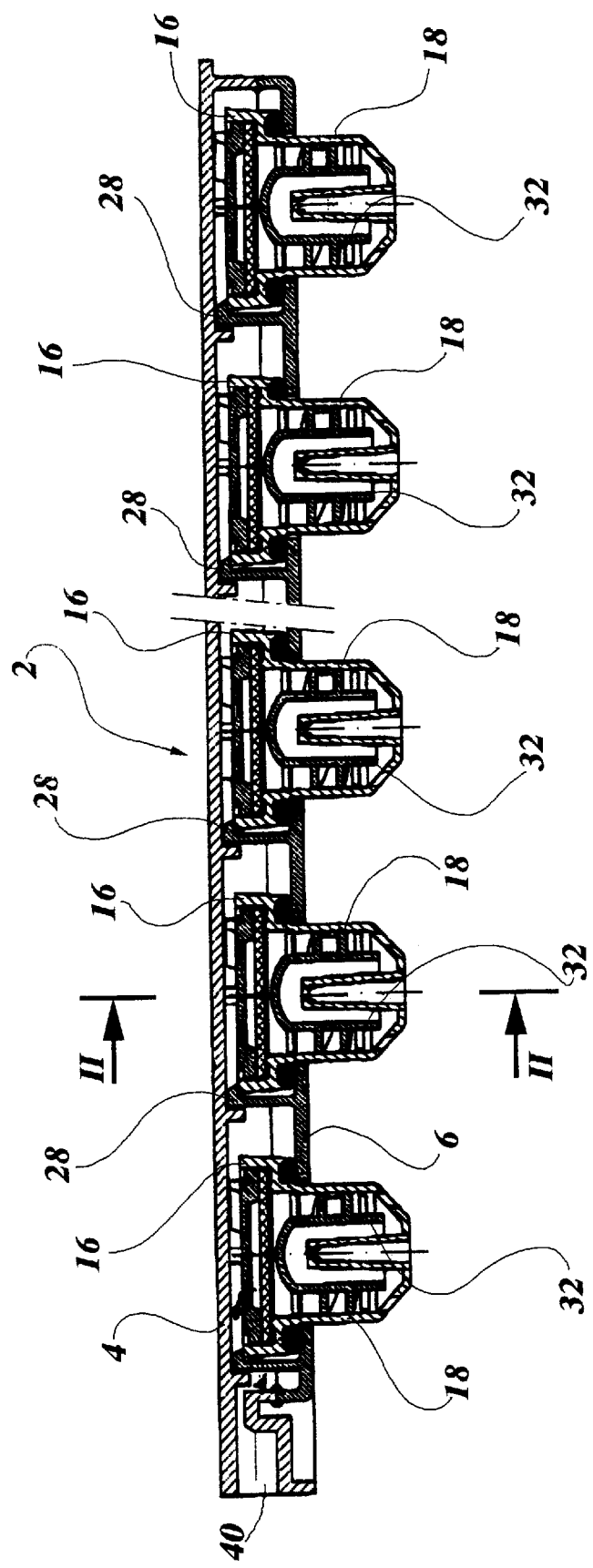
FIG. 1 is a vertical section through a plug-holder strip according to the invention.
Figure 2:
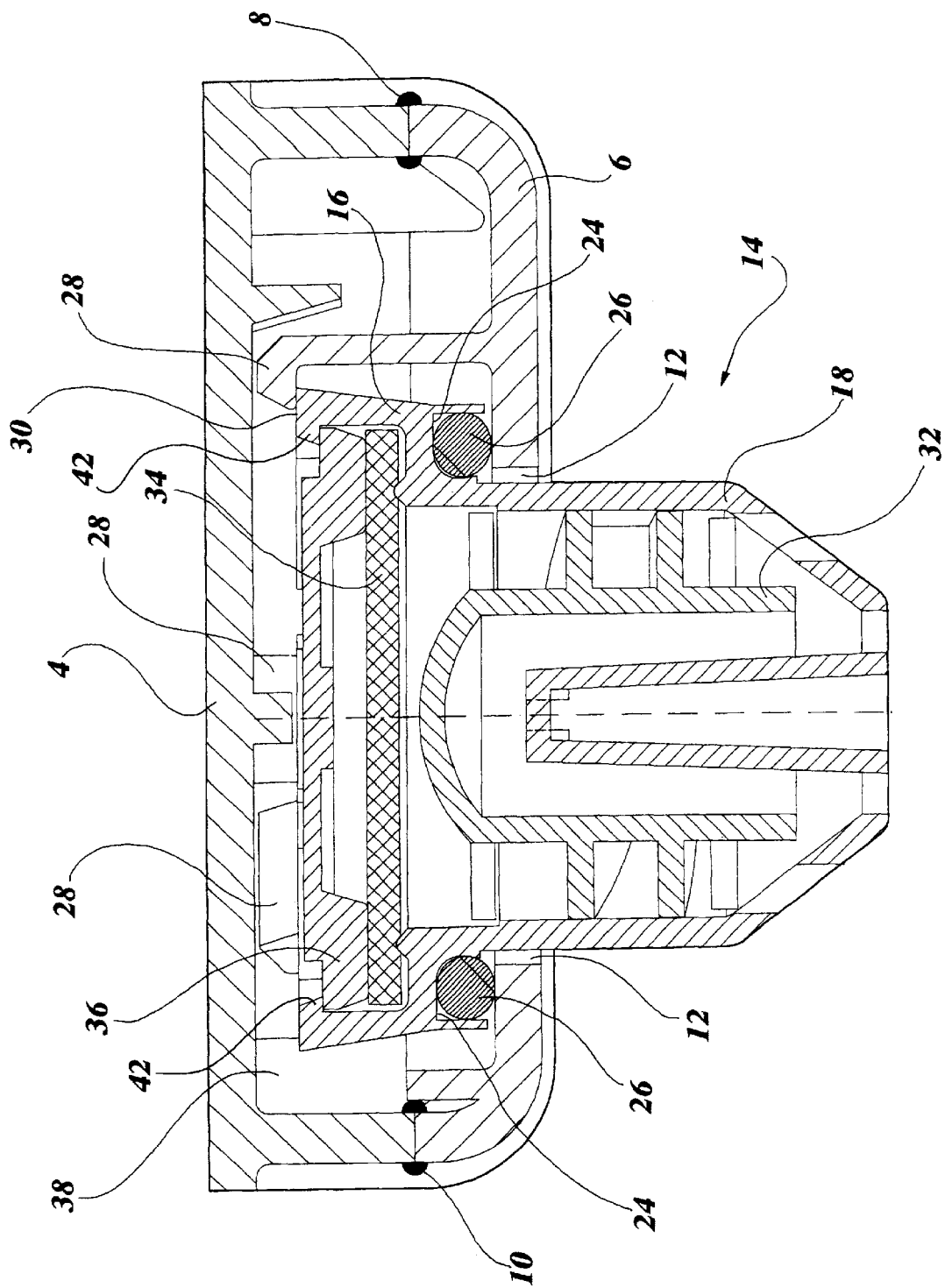
FIG. 2 is a section taken on the line II—II of FIG. 1.

The appended drawings relate, for simplicity, to a plug-holder strip for normal starter batteries which are generally constituted by six cells in series; clearly, however, the present invention is equally applicable to batteries constituted by any number of cells in series and even for batteries intended for uses other than starting.

In the embodiment shown in the drawings, the plug-holder strip is generally indicated 2 and the support structure is a box-like structure formed by an upper half-shell 4 and by a lower half-shell 6, connected to one another, for example, by welding at 8 and 10 and defining an internal gas-collection chamber 38.

The lower half-shell 6 has a plurality of tubular plugs 14 with respective enlarged head portions 16, and with body portions 18 to be fitted in complementary holes in a cover 22 of a battery 1.

The head portion 16 of each plug is tapered towards the body 18 and has an annular seat 24 for housing a toric seal 26 which surrounds the hole 12 and bears on the inner surface of the lower half-shell 6.

Each plug is held in position by resilient L-shaped or tooth-shaped retaining members 28 which are integral with the lower half shell 6 and can snap-engage the upper annular surface 30 of the head portion of each plug. Typically there are 3 or 4 retaining members 28 and they are spaced apart angularly around the head portion of each plug. The tapered head of the plug is snap-engaged between the retaining members until the toric seal 26 is compressed in its seat 24, between the lower half-shell 6 and the head portion 16 of the plug.

As will be noted, the arrangement is such that the seal 26 can exert an effective sealing action, preventing the gases which are conveyed through the plugs into the chamber defined between the two half-shells 6 and 4 from escaping through the holes 12. At the same time, the friction generated by the contact between the seal 26 and the lower half-shell 6 cooperates with the retaining means 28 to hold each plug in position whilst allowing the plug a freedom of movement such that the axis of each plug perpendicular to the plane of the half-shell 6 can be aligned or made to coincide with the axis of the complementary hole 20 in the cover.

In the plug-holder strip structure according to the invention, the plugs are thus connected to the support structure by resilient and yielding connection means, comprising the seal 26 and retaining members 28 which in any case ensure the leaktightness and the necessary mobility of the plugs.

The structure of each plug may be conventional and known per se; for example, the structure may conform to that described in the Applicant's British patent application 9814516.2. Each plug comprises, for example, a labyrinthine tubular element 32 and a semi-permeable membrane pad 34 housed in a seat formed in the head of the plug for enabling the gases coming from the labyrinth to escape; the membrane 34 is clamped in place by means of a retaining disc 36. The annular rim of the head 16 is preferably shaped with a tooth 42 which can snap-engage and retain the disc 36. The gases coming from the labyrinth, which pass through the membrane 34, pass through holes (not shown) in the retaining element 36 and enter the chamber 38 defined between the two half-shells 4 and 6, which acts as a collector for the gases coming from each plug; the gases can be discharged to the exterior through a lateral hole 40.

What is claimed is:

1. A plug-holder strip for an accumulator battery, comprising:
  a plurality of plugs to be fitted in complementary holes in a cover of a battery, and
  a support structure which interconnects the plugs, the plugs being connected to the support structure by yielding connection means which allow the plugs to move relative to the support structure to enable the plugs to be aligned with the holes in the cover, wherein:
    each plug is fitted in a through-hole in the support structure, and the connection means comprise an annular sealing member which surrounds the hole and forms a seal between the plug and the support, and resilient retaining means which are associated with the support structure and compress the plug onto the sealing member to ensure leaktightness whilst maintaining the ability of the plug to move relative to the support.

2. A plug-holder strip according to claim 1, wherein each plug has an enlarged head portion having an annular seat for receiving the annular sealing member, the annular sealing member being housed in the seat in a position interposed between the head of the plug and the support structure.

3. An Accumulator battery comprising a plug-holder strip according to claim 1.

4. A plug-holder strip for an accumulator battery, comprising:
  a plurality of plugs to be fitted in complementary holes in a cover of a battery, and
  a support structure which interconnects the plugs, the plugs being connected to the support structure by yielding connection means which allow the plugs to move relative to the support structure to enable the plugs to be aligned with the holes in the cover, wherein:
    each plug is fitted in a through-hole in the support structure, and the connection means comprise an annular sealing member which surrounds the hole and forms a seal between the plug and the support, and retaining means which are associated with the support structure and compress the plug onto the sealing member to ensure leaktightness whilst maintaining the ability of the plug to move relative to the support,
  wherein each plug has an enlarged head portion having an annular seat for receiving the annular sealing member, the annular sealing member being housed in the seat in a position interposed between the head of the plug and the support structure, and
  wherein the support structure comprises a lower half-shell and an upper half-shell connected to one another and defining a gas-collection chamber, the retaining means comprising a plurality of resilient retaining members which are formed as teeth and which extend from the lower half-shell and engage the head portion of each plug.

5. A plug-holder strip according to claim 4, wherein the resilient retaining members are spaced apart angularly around the head portion of each plug.

6. A plug-holder strip according to claim 5, wherein the head portion of each plug has a side wall which is tapered towards the lower half-shell so as to enable each plug to be snap-fitted between the resilient retaining members.

* * * * *